United States Patent
Ko

[19]

[11] Patent Number: 5,826,611
[45] Date of Patent: Oct. 27, 1998

[54] PRESSURE BALANCER STRUCTURE FOR WATER PASSAGE OF COMBINATION FAUCET

[75] Inventor: Hsi-Chia Ko, Changhua Hsien, Taiwan

[73] Assignee: Chung Cheng Faucet Co., Ltd., Taipei, Taiwan

[21] Appl. No.: 752,520

[22] Filed: Nov. 20, 1996

[51] Int. Cl.[6] .................................................... G05D 11/16
[52] U.S. Cl. .................. 137/100; 137/454.6; 137/625.41
[58] Field of Search .......................... 137/98, 100, 454.6, 137/625.41

[56] References Cited

U.S. PATENT DOCUMENTS 3,921,659  11/1975  Rudewick ....................... 137/625.41 X
5,501,244   3/1996  Shahriar ..................................... 137/98

*Primary Examiner*—Stephen M. Hepperle
*Attorney, Agent, or Firm*—Bacon & Thomas

[57] ABSTRACT

A pressure balancer structure for water passage of combination faucet mainly including a balancing rod and a balancing membrane. The balancing rod and the balancing membrane can smoothly perform pressure balancing operation and the balancing membrane can be stably secured on the balancing rod. The balancing membrane is planely concaved toward the hot or cold water pressurized face so that the balancing rod can be concentrically axially accurately displaced.

1 Claim, 2 Drawing Sheets

PRESSURE BALANCER STRUCTURE FOR WATER PASSAGE OF COMBINATION FAUCET

BACKGROUND OF THE INVENTION

The present invention relates to a pressure balancer structure for water passage of combination faucet mainly including a balancing rod and a balancing membrane. The balancing rod and the balancing membrane can smoothly perform pressure balancing operation and the balancing membrane can be stably secured on the balancing rod. The balancing membrane is planely concaved toward the hot or cold water pressurized face so that the balancing rod can be concentrically axially accurately displaced.

SUMMARY OF THE INVENTION

It is therefore a primary object of the present invention to provide a pressure balancer structure for water passage of combination faucet including a balancing rod and a balancing membrane. The balancing rod includes a small diameter section and a hot and a cold water guiding posts respectively disposed at two ends of the small diameter section. Pressure adjusting orifices are formed on the small section and auxiliary springs are fitted with the large step of the stepped socket of two ends of the balancing rod. By means of the pressure adjustment orifices, the hot (cold) guiding posts will not cause vacuum in the circular sinks of the balancer housings to intervene with the smooth pushing of the guiding posts. The auxiliary springs serve to assist in the pushing movement so as to ensure that the balancing rod and the balancing membrane can smoothly perform pressure balancing operation.

It is a further object of the present invention to provide the above pressure balancer structure in which the cold water guiding post of the balancing rod, lower flange and higher flange are sequentially quickly pressed and passed through the central hole of the balancing mambrane by the resilience of the rubber material. The inner annular groove defined by the close flange of the balancing membrane is fitted between the stopper disk and the higher flange of the balancing rod. The auxiliary fitting ring is fitted on the outer periphery of the higher flange so as to enlarge the outer diameter to prevent the balancing membrane from folding and slipping due to water pressure and avoid abnormal operation of the balancing membrane.

It is still a further object of the present invention to provide the above pressure balancer structure in which the large adjustment flange (large adjustment groove) or small adjustment flange (small adjustment groove) of the balancing membrane will be planely concaved toward the hot or cold water pressurized face so as to avoid abnormal dented face and uneven pressure which will lead to that the balancing rod cannot be concentrically axially and smoothly displaced.

It is still a further object of the present invention to provide the above pressure balancing structure in which in case a user incautiously or improperly rotates the handle of the controlling knob to a position of totally discharging the hot water, the balancing membrane is simultaneously pushed to the hot water side and dented, whereby the close flange of the hot water pressurized face of the balancing membrane abuts against the arch tail section of the projecting body in the chamber to seal the circular sink so as to stop the hot water from flowing out and avoid scalding of the user.

The present invention can be best understood through the following description and accompanying drawings, wherein:

DETAILED DESCRIPTION OF THE PREFERRED EMBODIMENT

Figure 1:
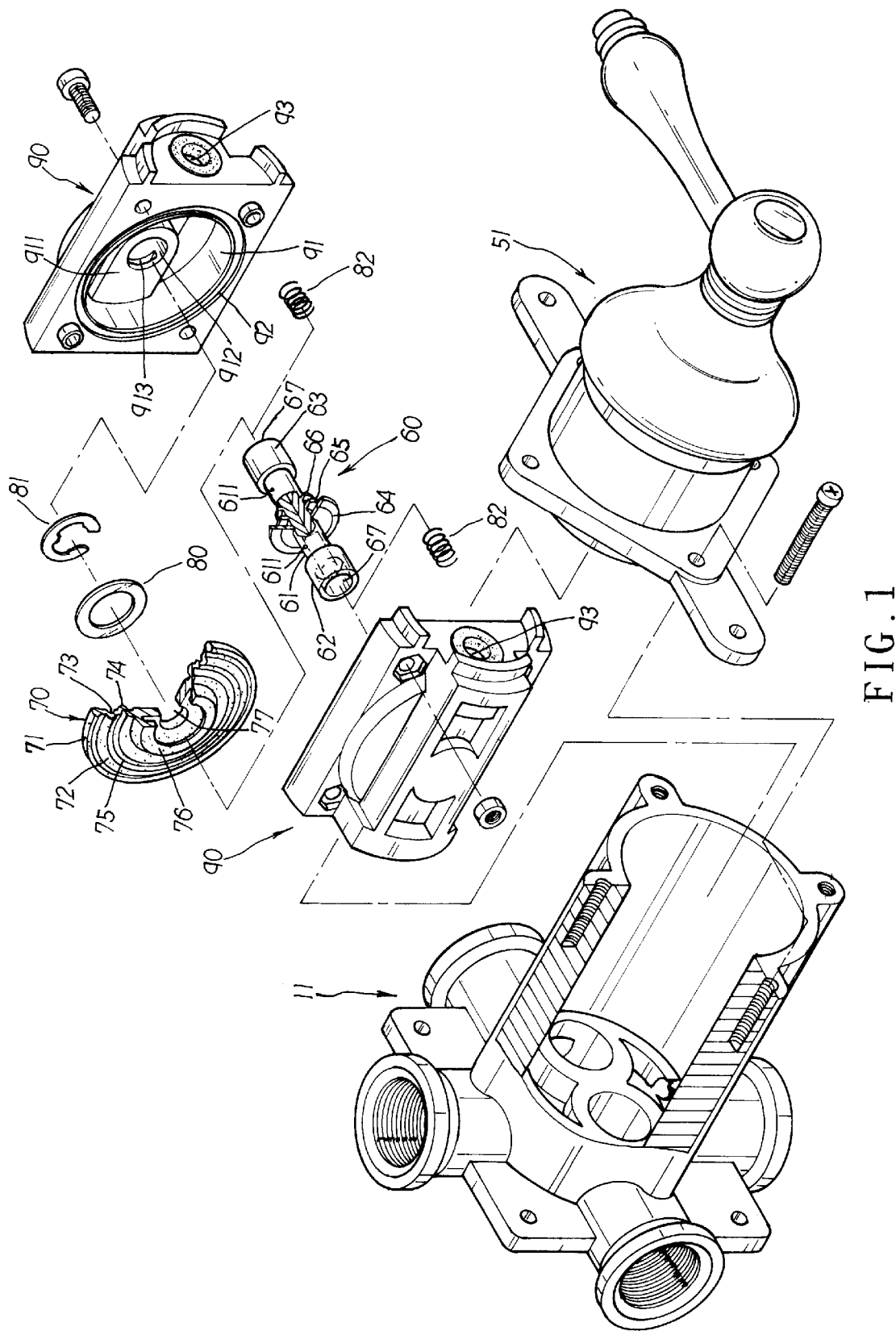
FIG. 1 is a perspective exploded view of the present invention.

Please refer to FIG. 1. The present invention includes a faucet body 11, a balancing rod 60, a balancing membrane 70, an auxiliary fitting ring 80, a C-shaped latch ring 81, two auxiliary springs 82, two balancer housings 90 and a controlling knob 51. The balancing rod 60 includes a small diameter section 61 and a hot and a cold water guiding posts 62, 63 respectively disposed at two ends of the small diameter section. A stopper disk 64 is disposed at middle section near the hot water guiding post 62 and a higher and a lower flanges 65, 66 are disposed near the cold water guiding post 63. A stepped socket 67 is disposed at each end of the balancing rod 60. Each end of the small diameter section 61 is disposed with a pressure adjusting orifice 611 communicated with the small step of the stepped socket 67. The balancing membrane 70 is made of rubber material and has a waved cross-section. The periphery thereof is disposed with an engaging flange 71. A loop of large adjustment flange 72 is disposed on hot water pressurized face and spaced from inner side of the engaging flange 71 by a certain distance. The back face (cold water pressurized face) of the large adjustment flange 72 is formed with a loop of large adjustment groove 73 correspondingly. The cold water pressurized face of the balancing membrane 70 is disposed with a loop of small adjustment flange 74 which is spaced from the inner side of the large adjustment groove 73 by a certain distance. The back face (hot water pressurized face) of the large adjustment flange 74 is formed with a loop of small adjustment groove 75 correspondingly. The hot water pressurized face of the balancing membrane 70 is disposed with a close loop of flange 76 which is spaced from the inner side of the small adjustment groove 75 by a certain distance to define an inner annular groove. The balancing membrane 70 is formed with a central hole 77. The balancer housing 90 are disposed with chambers 91 on opposite inner sides. The outer periphery of the chamber 91 is formed with an annular groove 92. The rear edge of interior of the chamber 91 has a projecting body 911 extending forward to middle section with an arch tail section. The inner side of the arch tail section is disposed with a circular sink 912. The inner wall of the circular sink 912 is disposed with a transverse water inlet 913 communicated with the water inlet (not shown) disposed on rear end face of the balancer housing 90. The front end face of the balancer housing 90 is disposed with a water outlet communicated with the chamber 91.

Figure 2:
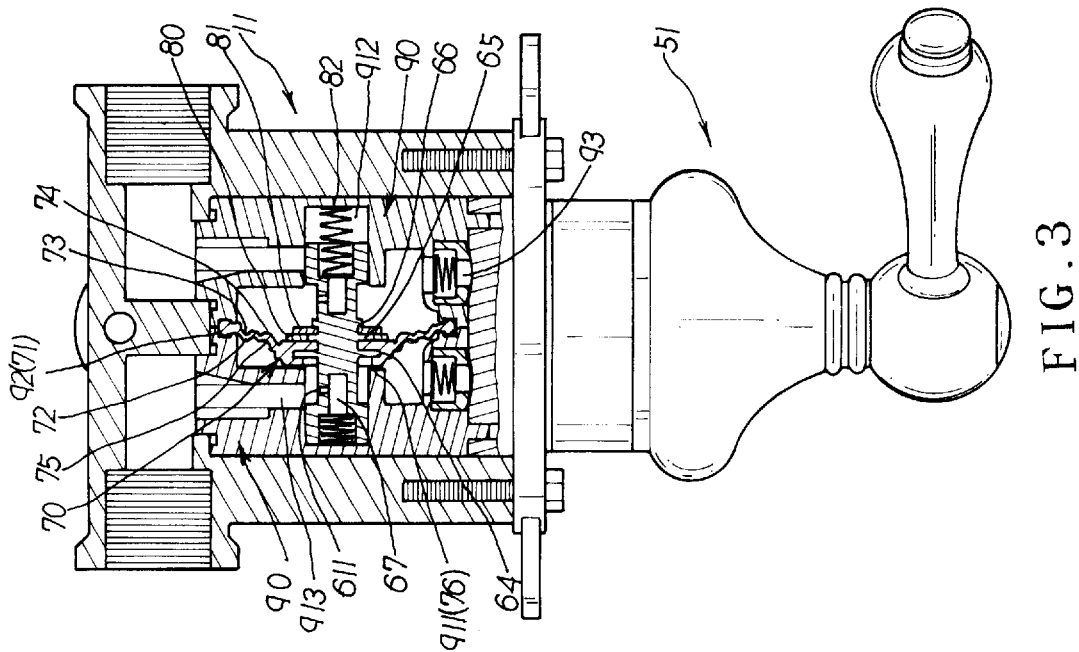
FIG. 2 is a sectional assembled view of the present invention.
Figure 3:
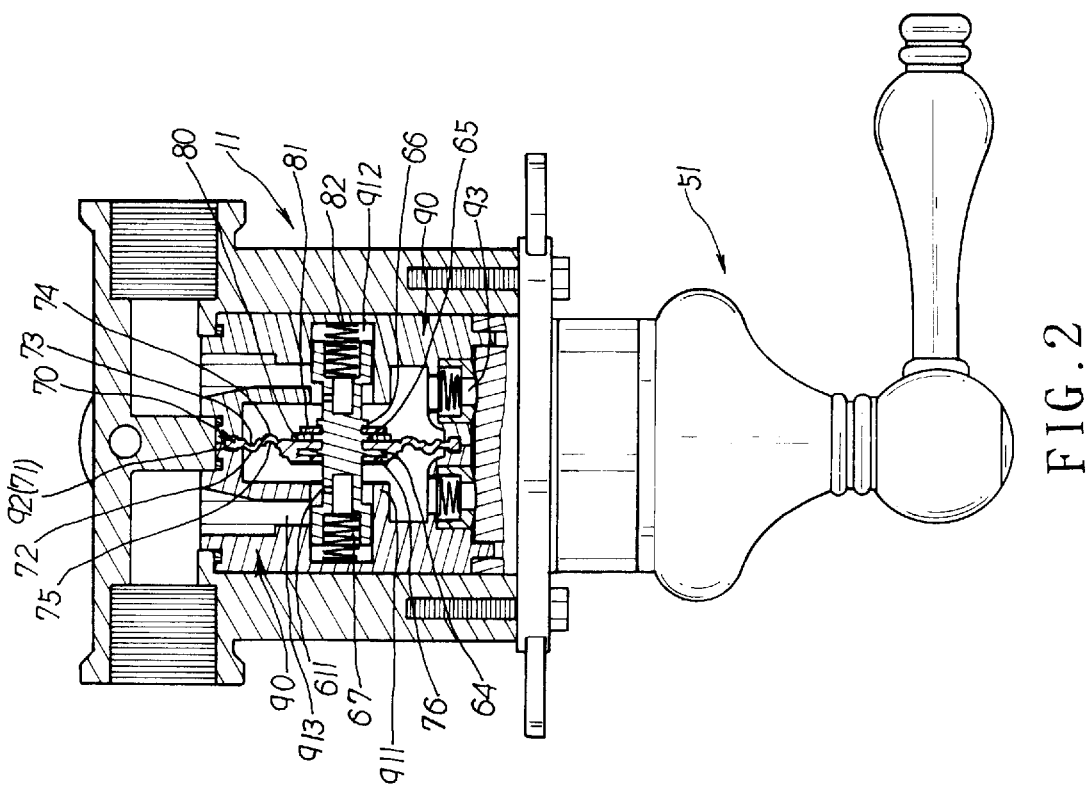
FIG. 3 is a sectional view according to FIG. 2, showing that the user is protected from being scalded by hot water.

Referring to FIG. 2, when assembled, the cold water guiding post 63 of the balancing rod 60, lower flange 66 and higher flange 65 are sequentially quickly pressed and passed through the central hole 77 of the balancing mambrane 70 by the resilience of the rubber material. The inner annular groove defined by the close flange 76 of the balancing membrane 70 is fitted between the stopper disk 64 and the higher flange 65 of the balancing rod 60. The auxiliary fitting ring 80 is then fitted around the cold water guiding post 63 and lower flange 66 of the balancing rod 60 and fitted onto the higher flange 65 and attached to the cold water pressurized face of the balancing membrane 70. The C-shaped latch ring 81 is latched between the higher and lower flanges 65, 66 of the balancing rod 60 so as to restrict the auxiliary fitting ring 80 from detachment. The auxiliary fitting ring 80 is fitted on the outer periphery of the higher flange 65 so as to enlarge the outer diameter to prevent the balancing membrane 70 from folding and slipping due to water pressure and avoid abnormal operation of the balancing membrane 70. The auxiliary springs 82 are fitted on the large steps of the stepped sockets 67 of the balancing rod 60 and the then balancing rod 60 together with the balancing membrane 70 is positioned between the two balancer housings 90, whereby the hot water guiding post 62 and cold water guiding post 63 are respectively fitted into the circular sinks 912 of the balancer housings 90. The engaging flange 71 of the periphery of the balancing membrane 70 is engaged in the annular groove 92 of the chamber 91 of the balancer housing 90 and the two balancer housings 90 are fixed together by screws and nuts and fitted into the faucet body 11. Then the controlling knob 51 is fitted into the opening of the faucet body 11 and secured therein by screws to complete the assembly.

In use, after the handle of the controlling knob 51 is adjusted to a proper temperature of discharged water, the hot and cold guiding posts 62, 63 both partially block the water inlets 913 of the balancer housings 90 and properly compress the springs 82. Once other manifolds are used simultaneously (for example, two bath rooms or kitchen cabinets are used), the pressure of the hot (or cold) water will decrease. At this time, the large adjustment flange 72 (large adjustment groove 73) or small adjustment flange 74 (small adjustment groove 75) of the balancing membrane 70 will be planely concaved toward the hot or cold water pressurized face so as to avoid abnormal dented face and uneven pressure which will lead to that the balancing rod 60 cannot be concentrically axially accurately displaced. Therefore, the balancing rod 60 is driven to smoothly move toward the hot (cold) water balancer housings 90 to further compress the spring 82. By means of the pressure adjusting orifices 611, the hot ( cold) guiding posts 62 (63) will not cause vacuum in the circular sinks 912 of the balancer housings 90 to intervene with the smooth pushing of the guiding posts 62, 63. Therefore, the transverse water inlet 913 of the circular sink 912 of the balancer housing 90 is partially stopped and enlarged by the hot (cold) water guiding posts 62 C 63) and the amount of the incoming hot (cold) water is simultaneously increased and a greater water pressure is generated to further push back the balancing membrane 70 to the original temperature balancing position and the springs 82 are simultaneously extended lo auxiliarily push the balancing rod 60 back to the cold (hot) water balancer housings 90, making the balancing rod 60 again reach the position needed for the combination temperature of the cold and hot water.

Referring to FIG. 6, in case a user incautiously or improperly rotates the handle of the controlling knob 51 to a position of totally discharging the hot water, this means the cold water side has a water pressure totally greater than the hot water side. Instantaneously, the balancing membrane 70 is simultaneously pushed to the hot water side and dented, whereby the close flange 76 of the hot water pressurized face of the balancing membrane 70 abuts against the arch tail section of the projecting body 911 in the chamber 91 to seal the circular sink 912 so as to stop the hot water from flowing out and avoid scalding of the user.

According to the above arrangement, the present invention has the following advantages:

1. The large adjustment flange 72 (large adjustment groove 73) or small adjustment flange 74 (small adjustment groove 75) of the balancing membrane 70 will be planely concaved toward the hot or cold water pressurized face so as to avoid abnormal dented face and uneven pressure which will lead to that the balancing rod 60 cannot be concentrically axially accurately displaced.

2. By means of the pressure adjusting orifices 611, the hot (cold) guiding posts 62 (63) will not cause vacuum in the circular sinks 912 of the balancer housings 90 to intervene with the smooth pushing of the guiding posts 62, 63. The auxiliary springs 82 serve to assist in the pushing movement so as to ensure that the balancing rod 60 and the balancing membrane 70 can smoothly perform pressure balancing operation.

3. The cold water guiding post 63 of the balancing rod 60, lower flange 66 and higher flange 65 are sequentially quickly pressed and passed through the central hole 77 of the balancing mambrane 70 by the resilience of the rubber material. The inner annular groove defined by the close flange 76 of the balancing membrane 70 is fitted between the stopper disk 64 and the higher flange 65 of the balancing rod 60. The auxiliary fitting ring 80 is fitted on the outer periphery of the higher flange 65 so as to enlarge the outer diameter to prevent the balancing membrane 70 from folding and slipping due to water pressure and avoid abnormal operation of the balancing membrane.

4. In case a user incautiously or improperly rotates the handle of the controlling knob 51 to a position of totally discharging the hot water, the hot water will not flow out to avoid scalding of the user.

The above embodiment is only an example of the present invention and the scope of the present invention should not be limited to the example. Any modification or variation derived from the example should fall within the scope of the present invention.

What is claimed is:

1. A pressure balancer structure for water passage of combination faucet, comprising a faucet body, a balancing rod, a balancing membrane, an auxiliary fitting ring, a C-shaped latch ring, two auxiliary springs, two balancer housings and a controlling knob, the balancing rod including a small diameter section and a hot and a cold water guiding posts respectively disposed at two ends of the small diameter section, a periphery of the balancing membrane being disposed with an engaging flange and the center of the balancing membrane being formed with a through hole, the balancer housing being disposed with chambers on opposite inner sides, the outer periphery of the chamber being formed with an annular groove, the front end face of the balancer housing being disposed with a water outlet communicated with the chamber, said structure being characterized in that:

a stopper disk is disposed at middle section near the hot water guiding post and a higher and a lower flanges are disposed near the cold water guiding post, a stepped socket being disposed at each end of the balancing rod, each end of the small diameter section being disposed with a pressure adjusting orifice communicated with the small step of the stepped socket;

the balancing membrane is made of rubber material and has a waved cross-section, a loop of large adjustment flange being disposed on hot water pressurized face and spaced from inner side of the engaging flange by a certain distance, the back face (cold water pressurized face) of the large adjustment flange being formed with a loop of large adjustment groove correspondingly, the cold water pressurized face of the balancing membrane being disposed with a loop of small adjustment flange which is spaced from the inner side of the large adjustment groove by a certain distance, the back face (hot water pressurized face) of the large adjustment flange being formed with a loop of small adjustment groove correspondingly, the hot water pressurized face of the balancing membrane being disposed with a close loop of flange which is spaced from the inner side of the small adjustment groove by a certain distance to define an inner annular groove; and a rear edge of interior of the chamber of the balancer housing has a projecting body extending forward to middle section with an arch tail section, the inner side of the arch tail section being disposed with a circular sink, the inner wall of the circular sink being disposed with a transverse water inlet communicated with the water inlet disposed on rear end face of the balancer housing, whereby when assembled, the cold water guiding post of the balancing rod, lower flange and higher flange are sequentially quickly pressed and passed through the central hole of the balancing mambrane by the resilience of the rubber material, the inner annular groove defined by the close flange of the balancing membrane being fitted between the stopper disk and the higher flange of the balancing rod, the auxiliary fitting ring being then fitted around the cold water guiding post and lower flange of the balancing rod and fitted onto the higher flange and attached to the cold water pressurized face of the balancing membrane, the C-shaped latch ring being latched between the higher and lower flanges of the balancing rod so as to restrict the auxiliary fitting ring from detachment, the auxiliary springs being fitted on the large steps of the stepped sockets of the balancing rod and the then balancing rod together with the balancing membrane being positioned between the two balancer housings, whereby the hot water guiding post and cold water guiding post are respectively fitted into the circular sinks of the balancer housings, whereby it is ensured that the balancing rod and the balancing membrane can smoothly perform pressure balancing operation and the balancing membrane can be stably secured on the balancing rod, the balancing membrane being planely concaved toward the hot or cold water pressurized face so that the balancing rod can be concentrically axially accurately displaced.

\* \* \* \* \*